(12) United States Patent
Chaudhary

(10) Patent No.: US 9,262,328 B2
(45) Date of Patent: Feb. 16, 2016

(54) USING CACHE HIT INFORMATION TO MANAGE PREFETCHES

(71) Applicant: NVIDIA Corporation, Santa Clara, CA (US)

(72) Inventor: Anurag Chaudhary, San Jose, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 33 days.

(21) Appl. No.: 13/686,556

(22) Filed: Nov. 27, 2012

(65) Prior Publication Data

US 2014/0149678 A1 May 29, 2014

(51) Int. Cl.
*G06F 13/00* (2006.01)
*G06F 12/08* (2006.01)

(52) U.S. Cl.
CPC ........ *G06F 12/0862* (2013.01); *G06F 12/0802* (2013.01); *G06F 12/0897* (2013.01); *G06F 2212/6026* (2013.01)

(58) Field of Classification Search
CPC ............ G06F 12/0802; G06F 12/0897; G06F 12/0862
USPC .......... 711/137, 141, 145; 710/11, 35, 39, 56; 712/207
See application file for complete search history.

(56) References Cited

U.S. PATENT DOCUMENTS

| | | | |
|---|---|---|---|
| 6,507,895 B1* | 1/2003 | Wang et al. | 711/137 |
| 2007/0067382 A1* | 3/2007 | Sun | G06F 12/0862 709/203 |
| 2007/0266228 A1* | 11/2007 | Smith et al. | 712/238 |
| 2007/0283134 A1* | 12/2007 | Smith et al. | 712/239 |
| 2008/0034187 A1* | 2/2008 | Stempel et al. | 712/205 |
| 2009/0198909 A1 | 8/2009 | Speight et al. | |
| 2009/0216956 A1 | 8/2009 | Ekanadham et al. | |
| 2011/0113199 A1 | 5/2011 | Tang et al. | |
| 2011/0161589 A1 | 6/2011 | Guthrie et al. | |
| 2012/0144104 A1 | 6/2012 | Gibney et al. | |
| 2013/0185515 A1* | 7/2013 | Sassone et al. | 711/137 |

OTHER PUBLICATIONS

Gao et al., "Two-level Data Prefetching", 2007, IEEE, pp. 238-244.*
Irie, et al., CCCPO: Robust Prefetcher Optimization Technique Based on Cache Convection, 2011 Second International Conference on Networking and Computing, Nov. 30, 2011-Dec. 2, 2011, p. 127-133, IEEE, Tokyo, Japan.

* cited by examiner

*Primary Examiner* — Reba I Elmore

(57) ABSTRACT

Cache hit information is used to manage (e.g., cap) the prefetch distance for a cache. In an embodiment in which there is a first cache and a second cache, where the second cache (e.g., a level two cache) has greater latency than the first cache (e.g., a level one cache), a prefetcher prefetches cache lines to the second cache and is configured to receive feedback from that cache. The feedback indicates whether an access request issued in response to a cache miss in the first cache results in a cache hit in the second cache. The prefetch distance for the second cache is determined according to the feedback.

18 Claims, 5 Drawing Sheets

USING CACHE HIT INFORMATION TO MANAGE PREFETCHES

BACKGROUND

A primary factor in the utility of a computer system is the speed at which the computer system can execute an application. It is important to have instructions and data available at least as fast as the rate at which they can be executed, to prevent the computer system from idling (stalling) while it waits for the instructions and/or data to be fetched from main memory.

A widely used solution to reduce or prevent stalling is to implement a hierarchy of caches in the computer system. In essence, one or more caches are situated between the main memory and the central processing unit (CPU). The caches store recently used instructions and data based on the assumption that information might be needed again. By storing information in a hierarchical manner, the caches can reduce latency by providing information more rapidly than if the information had to be retrieved from, for example, the main memory.

The closer a cache is to the CPU, the shorter the latency between the cache and the CPU. The cache closest to the CPU is usually referred to as the level one (L1) cache, the next cache is usually referred to as the level two (L2) cache, and so on. Information most likely to be needed by the CPU, or information more recently accessed by the CPU, is stored in the L1 cache, the next tier of information is stored in the L2 cache, and so on.

Latency can be further reduced by prefetching information into the caches. Prefetching involves, in essence, making a prediction of the information that may be needed by an application, and then prefetching that information from, for example, the main memory into a cache, or from one cache into a cache that is closer to the CPU (e.g., from the L2 cache to the L1 cache).

Hardware-initiated prefetching is typically based on a pattern-matching mechanism. The traffic stream (e.g., the stream of access requests for instructions or data) is monitored to try to find a pattern to the requests. If a pattern can be found, then that pattern can be used to anticipate subsequent requests for information, so that information can be prefetched. For example, if the prefetcher determines that data has been requested from addresses 2, 4, and 6 in the L2 cache because of cache misses in the L1 cache (e.g., a pattern of every other address, corresponding to every other cache line), then the prefetcher can anticipate that the cache line at address 8 might also be needed and can prefetch that cache line.

There is a basic tradeoff in prefetching. As noted above, prefetching can improve performance by reducing latency. On the other hand, if too much information (e.g., too many cache lines) is prefetched, then the efficiency of the prefetcher may be reduced. Furthermore, if too much information is prefetched, then the cache might become polluted with cache lines that might not actually be needed. If the cache is full, then prefetching new cache lines into the cache can cause useful lines to be prematurely evicted in order to make room for the new lines.

The benefits and risks of prefetching both can increase as the prefetch distance is increased. The prefetch distance is a measure of how far to prefetch based on an observed pattern. If, for instance, data is fetched from addresses 2, 4, and 6 (a pattern of every other address), then data can be prefetched from address 8 if the prefetch distance is one, from addresses 8 and 10 if the prefetch distance is two, and so on. In general, the prefetch distance specifies the number of accesses projected along a pattern starting from a starting point in the pattern (usually, from the last demand access that is a part of the pattern).

The prefetch distance can be managed using a confidence value associated with the pattern. The confidence value, in effect, is a measure of how often the pattern is observed or, equivalently, the number of elements that make up the pattern. The confidence value, and hence the prefetch distance, may initially be zero; that is, prefetching might not begin as soon as an apparent pattern is detected. Instead, prefetching might begin only if the pattern is observed repeatedly; each time the pattern is observed, the confidence value can be incremented, and the prefetch distance can be increased when the confidence value reaches a threshold. In the example above, if the pattern indeed continues as expected and ends up including addresses 8 and 10 in addition to addresses 2, 4, and 6, then the confidence value might be incremented and prefetching can begin. If the pattern continues beyond address 10, then the confidence value and consequently the prefetch distance can again be increased. In other words, if the actual pattern continues to match the predicted pattern, then the confidence value can be increased and, in turn, the prefetch distance can be increased.

SUMMARY

As used herein, an access request refers to a request for information (data and/or instructions) from a memory element. An access request may be a demand request issued by a processing unit, or it may be a request issued by a computer system's operating system or memory management system. In response to an access request, information may be fetched from a memory element to a processing unit, or it may be fetched from one memory element to another memory element (e.g., from main memory to a cache, or from one cache to another).

As noted above, as the confidence level increases, the prefetch distance can increase as well. At some point, the prefetch distance can reach its design or user-specified limit, the maximum prefetch distance. However, there is an advantage to capping the prefetch distance at less than the maximum prefetch distance. For example, if L1 cache misses start hitting in the L2 cache when the prefetch distance for the L2 cache (the number of cache lines being prefetched into the L2 cache) is less than the maximum prefetch distance, then the prefetch distance for the L2 cache can be maintained at its current value so that a greater number of cache lines are not unnecessarily prefetched. That is, the fact that L1 cache misses are hitting in the L2 cache provides an indication that prefetching into the L2 cache is occurring far enough ahead, and thus it is not necessary to continue increasing the prefetch distance for the L2 cache beyond the current prefetch distance. By not increasing the prefetch distance beyond a value that is demonstrated as being sufficient, the possibility of a useful cache line being evicted prematurely from the L2 cache is reduced or eliminated. Also, overall efficiency is improved by some measures; for example, the prefetcher is not consuming bandwidth by prefetching more cache lines than are needed.

Embodiments according to the present invention utilize cache hit information to manage (e.g., cap) the prefetch distance for a cache. In an embodiment in which there is a first cache and a second cache, where the second cache (e.g., an L2 cache) has greater latency than the first cache (e.g., an L1 cache), a prefetcher prefetches cache lines to the second cache and is configured to receive feedback from that cache. The feedback indicates whether an access request issued in response to a cache miss in the first cache results in a cache hit in the second cache. The prefetch distance for the second cache is determined according to the feedback. In one such embodiment, the prefetch distance for the second cache is held at its current value, even if the confidence level continues to increase and even if the current value is less than the absolute maximum value.

In another embodiment, if the feedback indicates that an access request issued in response to a miss in the first cache results in a cache hit in the second cache, then the prefetch distance for the second cache is allowed to increase from its current value by a specified amount to a new (second) value, then held at the second value even if that value is less than the absolute maximum value. In this manner, an amount of margin is included in the prefetch distance for the second cache to account for changes in latencies in caching and/or prefetching. For example, if access requests are occurring relatively close to one another, then a larger prefetch distance may be needed; conversely, if access requests are occurring less frequently, then a smaller prefetch distance may be satisfactory. Thus, if the prefetch distance is capped, without margin, at its current value based on the current frequency of access requests, then that prefetch distance may not be satisfactory if the frequency of access requests increases. Without margin, some access requests issued in response to a cache miss in the first cache might result in a cache miss in the second cache as well, at least for the amount of time it takes for the prefetcher to catch up to the increased frequency of access requests (that is, until the prefetcher is able to detect the pattern of cache misses in the second cache and increase the prefetch distance for the second cache accordingly). With margin, this situation can be avoided.

The prefetch distance for each cache in a hierarchy of caches can be managed in a manner similar to that described above. The prefetch distance can be different for each of the caches. Thus, for example, the prefetch distance for the L1 cache can be less than the prefetch distance for the L2 cache. This would reduce overall latency while also reducing pollution of the L1 cache.

Thus, there are a number of other advantages associated with the features of the present invention. For example, the prefetch distance can be managed so that it is satisfactory for reducing cache misses and for mitigating the latencies associated with such misses, but does not result in evicting potentially useful cache lines from the caches and does not consume computer resources (e.g., bandwidth) by prefetching relatively large numbers of cache lines when it is not necessary to do so. By managing prefetch distance, information is still retrieved in advance of when it is needed but not too far in advance; that is, a sufficient number of cache lines are prefetched but not too many cache lines. In effect, some prefetches are postponed without negatively affecting computer system performance.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
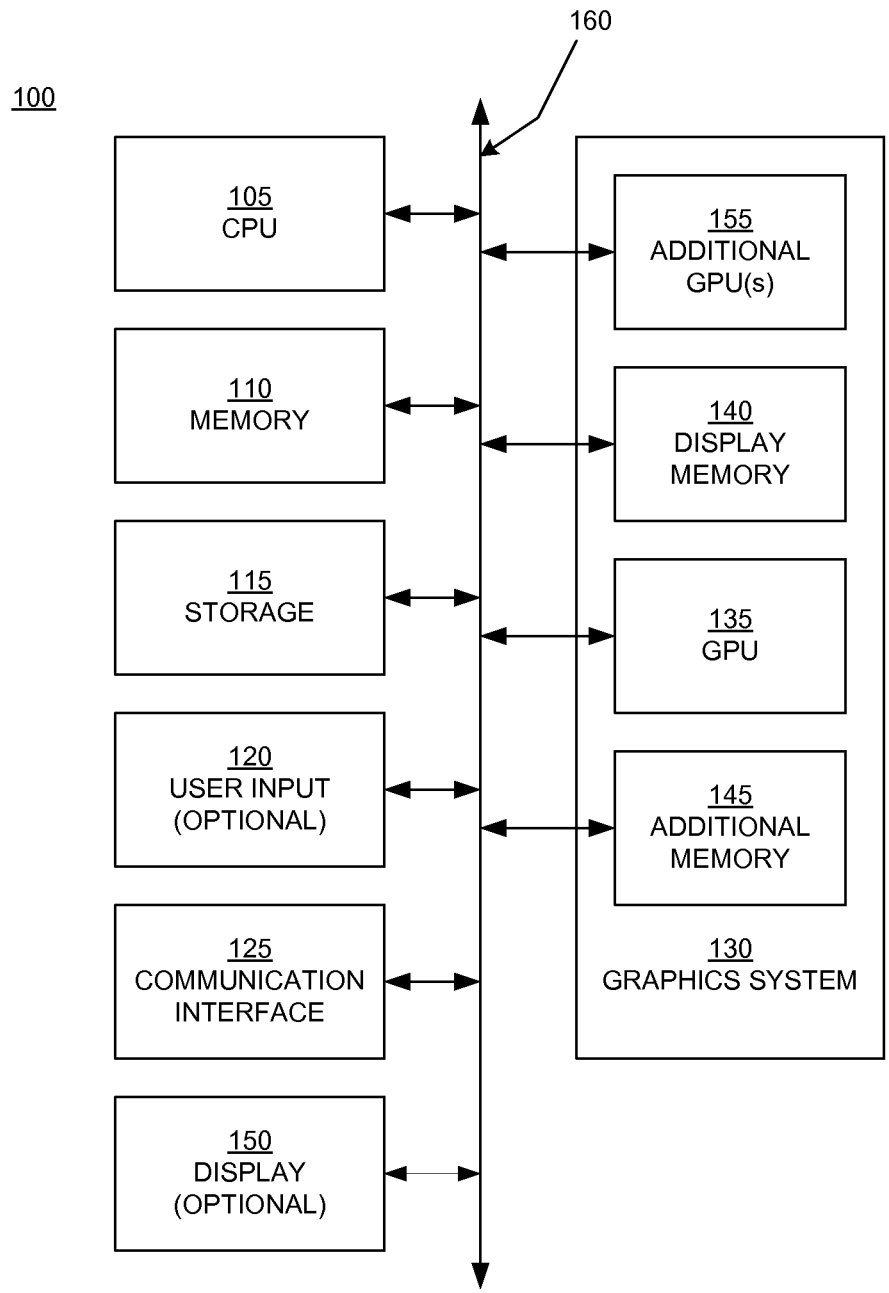
FIG. 1 is a block diagram of an example of a computer system capable of implementing embodiments according to the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "fetching," "prefetching," "selecting," "establishing," "observing," "translating," "accessing," "storing," "determining," "increasing," "incrementing," "detecting," "suspending," "maintaining," "sending," "capping," or the like, refer to actions and processes (e.g., flowchart 600 of FIG. 6) of a computer system or similar electronic computing device or processor (e.g., system 100 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Non-transitory computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computer system 100 capable of implementing embodiments according to the present invention. In the example of FIG. 1, the computer system 100 includes a central processing unit (CPU) 105 for running software applications and optionally an operating system. The memory 110 stores applications and data for use by the CPU 105. Storage 115 provides non-volatile storage for applications and data and may include fixed disk drives, removable disk drives, flash memory devices, and CD-ROM, DVD-ROM or other optical storage devices. The optional user input 120 includes devices that communicate user inputs from one or more users to the computer system 100 and may include keyboards, mice, joysticks, touch screens, and/or microphones. The communication or network interface 125 allows the computer system 100 to communicate with other computer systems via an electronic communications network, including wired and/or wireless communication and including the Internet. The optional display device 150 is any device capable of displaying visual information in response to a signal from the computer system 100. The components of the computer system 100, including the CPU 105, memory 110, data storage 115, user input devices 120, communication interface 125, and the display device 150, are connected via one or more data buses 160.

In the FIG. 1 embodiment, a graphics system 130 is connected with the data bus 160 and the components of the computer system 100. The graphics system 130 may include a physical graphics processing unit (GPU) 135 and graphics memory. The GPU 135 generates pixel data for output images from rendering commands.

Graphics memory may include a display memory 140 (e.g., a framebuffer) used for storing pixel data for each pixel of an output image. In another embodiment, the display memory 140 and/or additional memory 145 are part of the memory 110 and are shared with the CPU 105. Alternatively, the display memory 140 and/or additional memory 145 can be one or more separate memories provided for the exclusive use of the graphics system 130.

In another embodiment, graphics processing system 130 includes one or more additional physical GPUs 155, similar to the GPU 135. Each additional GPU 155 is adapted to operate in parallel with the GPU 135. Each additional GPU 155 generates pixel data for output images from rendering commands. Each additional physical GPU 155 can be configured as multiple virtual GPUs that are used in parallel (concurrently) by a number of applications executing in parallel. Each additional GPU 155 can operate in conjunction with the GPU 135 to simultaneously generate pixel data for different portions of an output image, or to simultaneously generate pixel data for different output images.

Each additional GPU 155 can be located on the same circuit board as the GPU 135, sharing a connection with the GPU 135 to the data bus 160, or each additional GPU 155 can be located on another circuit board separately connected with the data bus 160. Each additional GPU 155 can also be integrated into the same module or chip package as the GPU 135. Each additional GPU 155 can have additional memory, similar to the display memory 140 and additional memory 145, or can share the memories 140 and 145 with the GPU 135.

Figure 2A:
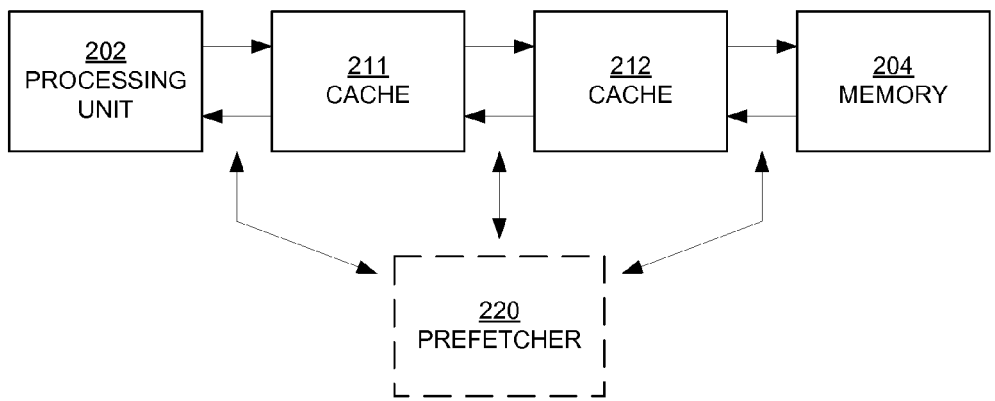
FIG. 2A is a block diagram of a computer system that includes a prefetcher in an embodiment according to the present invention.

FIG. 2A is a block diagram of a computer system 100 that includes a prefetcher 200 in an embodiment according to the present invention. In the example of FIG. 2A, a hierarchy of caches is located between the processing unit 202 and the memory 204. With reference to FIG. 1, the processing unit 202 may be, for example, the CPU 105 or the GPU 135, and the memory 204 may be, for example, the memory 110 or the storage 115, or the display memory 140 or the additional memory 145.

In the example of FIG. 2A, the caches include a first cache 211 and a second cache 212. Although only two caches are shown, embodiments according to the invention are not so limited. The first cache 211 is situated closer to the processing unit 202 than the second cache 212, and may be referred to as a level one (L1) cache. The second cache 212 is situated further away from the processing unit 202 relative to the first cache 211, and may be referred to as a level two (L2) cache. Generally speaking, the latency associated with the first cache 211 is less than the latency associated with the second cache 212.

The processing unit 202 can load or store information (data and/or instructions) into the first cache 211. The processing unit 202 can also request a line of information from the first cache 211; this type of request may be referred to as a demand request. If that information is in the first cache 211, it is referred to as a cache hit. If that line of information is not in the first cache 211 (referred to as a cache miss), then an attempt is made to access that line from the second cache 212. If that line is also not in the second cache 212, then an attempt is made to access that information from the memory 204 (or from another cache if the hierarchy of caches includes more than two caches). The operations just described can be performed under control of the computer system's operating system or memory management system, for example.

A prefetcher 220 is coupled to and can monitor the access requests between the various memory elements. Although the prefetcher 220 is illustrated as a separate element in FIG. 2A, it can be implemented in software as a component of the computer system's operating system or memory management system, for example.

Figure 2B:
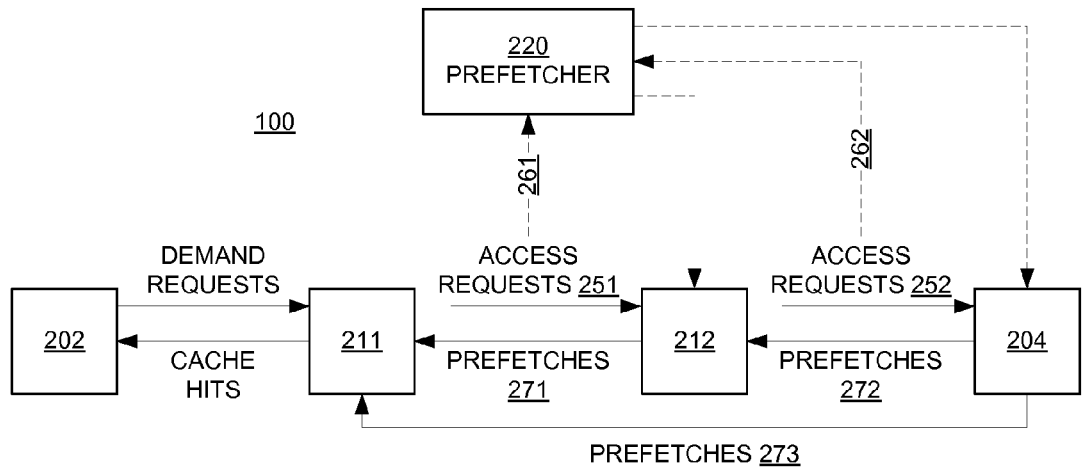
FIG. 2B is a block diagram illustrating the flow of information between elements including a prefetcher in an embodiment according to the present invention.

In particular, with reference to FIG. 2B, the prefetcher 220 can monitor and observe the stream 251 of access requests to the second cache 212, and can determine the pattern 261 of those requests. Also, the prefetcher 220 can monitor and observe the stream 252 of access requests to the memory 204, and can determine the pattern 262 of those requests.

The access requests issued to the second cache 212, for example, generally result from cache misses in the first cache 211. The prefetcher 220 can monitor cache misses in the first cache 211 and detect a pattern (the pattern 261) to the misses, if there is a pattern. That is, the prefetcher 220 can monitor the addresses included in demand requests to the first cache 211 and detect a pattern in the requests that result in cache misses in that cache. Alternatively, the prefetcher 220 can monitor the memory addresses included in the access requests to the second cache 212 (in order to fetch information from the second cache 212 to the first cache 211) and detect a pattern in those requests.

In general, a pattern can be detected based on the number of cache lines between two points in the pattern. The difference between two points in the pattern may be referred to as the delta or the stride. For example, if the pattern included access requests for every third cache line, then the delta or stride is three. The delta or stride between two access requests can be determined using the lower order bits of the address included in the access requests. If the delta or stride is constant over some number of access requests, then a pattern is present.

The prefetcher 220 can then make a prediction based on the pattern, and can prefetch lines from the second cache 212 to the first cache 211 based on the prediction. If, for example, the prefetcher 220 detects that the access requests to the second cache 212 are for every other cache line, then the prefetcher can prefetch every other cache line from the second cache 212 into the first cache 211. One or more lines can be prefetched at a time, depending on the prefetch distance and confidence level associated with the pattern, as described below. In the example of FIG. 2B, the prefetch stream 271 includes lines prefetched from the second cache 212 into the first cache 211 based on the pattern 261 that was determined by observing the stream 251 of access requests.

In a similar fashion, the prefetcher 220 can prefetch one or more lines (prefetch stream 272) from the memory 204 into the second cache 212, or one or more lines (prefetch stream 273) from the memory 204 directly into the first cache 211, or one or more lines from the memory 204 directly into both the first cache 211 and the second cache 212. Ideally, the cache lines in the prefetch streams 271, 272, and 273 precede a demand request for those lines.

Figure 3:
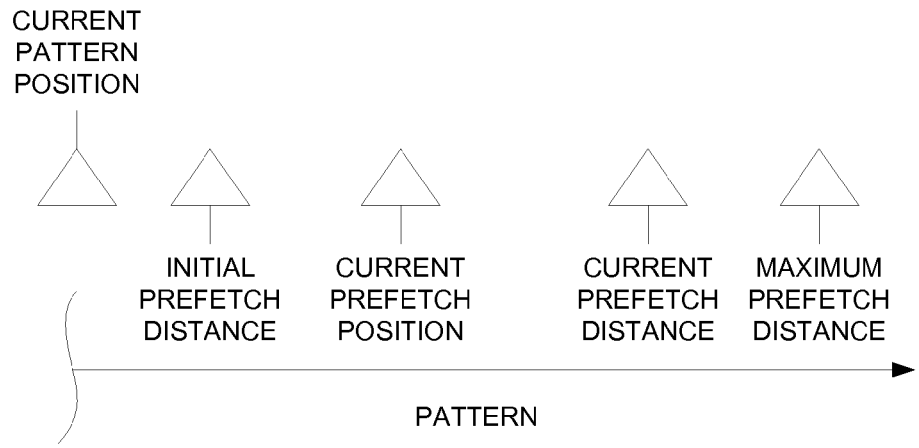
FIG. 3 illustrates prefetch distances in an embodiment according to the present invention.

In FIG. 3, the current pattern position indicates the last point in the pattern known to be correct. Prefetch distances are measured from the current pattern position. The current pattern position can move from left to right in FIG. 3 as points in the pattern are validated as correct. In other words, if a predicted access matches a later, actual access request (e.g., if a prefetched line results in a subsequent cache hit), then the current pattern position is moved accordingly.

The current prefetch position indicates how far prefetching has occurred within the pattern. The current prefetch position is between the current pattern position and the current prefetch distance. The prefetch distance is a measure of how far to prefetch in the pattern. The prefetch distance is determined by taking a starting point in the pattern (the current prefetch position) and projecting a number of accesses further along the pattern. The number of accesses is the prefetch distance. If the prefetch distance is one, then a single line (the next element in the pattern) is prefetched; if the prefetch distance is two, then the next two elements in the pattern are prefetched, and so on.

The initial prefetch distance can be established in advance. The prefetch distance may be initially set to one, for example, indicating that a single line will be prefetched at a time. The prefetch distance can change over time depending on, for example, the confidence level associated with the pattern. The confidence level can be incremented as the pattern increases in length and/or if the prefetched lines result in an increase in the frequency of cache hits.

In the example below (Table 1), the initial prefetch distance and initial confidence level are both zero (0). In the example, based on the addresses in the access requests issued in response to cache misses, a delta or stride of two (2) is observed by the prefetcher 220 (FIG. 2A). At some point, the confidence level is incremented as shown in the example. Once the confidence level reaches a threshold value (e.g., 2), then the prefetch distance can be increased. Generally speaking, the confidence level can be used as a factor in establishing the prefetch distance, but the prefetch distance is not necessarily directly correlated to the value of the confidence level.

TABLE 1

| Address | Delta | Confidence Level | Prefetch Distance |
|---------|-------|------------------|-------------------|
| 2       | —     | 0                | 0                 |
| 4       | 2     | 0                | 0                 |
| 6       | 2     | 1                | 0                 |
| 8       | 2     | 2                | 1                 |
| 10      | 2     | 3                | 2                 |
| etc.    | etc.  | etc.             | etc.              |

Continuing with reference to FIG. 3, the maximum prefetch distance is a defined (e.g., user-specified) limit on the prefetch distance. Thus, even if the confidence level continues to increase, the prefetch distance will not increase if the maximum prefetch distance has been reached.

Figure 4:
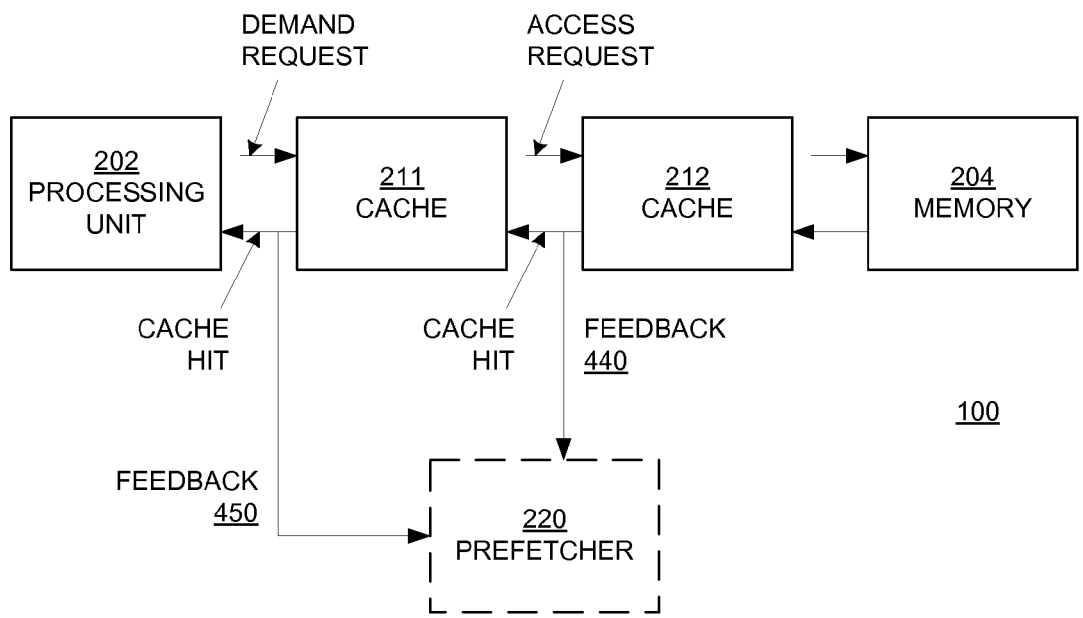
FIG. 4 is a block diagram of a computer system that includes a prefetcher in an embodiment according to the present invention.

FIG. 4 is a block diagram of a computer system 100 that includes a prefetcher 220 in an embodiment according to the present invention. As presented above, the first cache 211 is closer to the processing unit 202 than the second cache 212, and the first cache 211 has less latency relative to the second cache 212.

In embodiments according to the invention, the prefetcher 220 receives feedback 440 that indicates when an access request to the second cache 212 results in a cache hit in the second cache. More specifically, the feedback 440 indicates if there is a cache hit in the second cache 212 in response to an access request made in response to a cache miss in the first cache 211.

In one embodiment, each access request includes a memory address and an identifier (ID) that is unique enough to identify the request. In such an embodiment, the feedback 440 includes the same ID and address as a corresponding access request, and as such the feedback is sufficient to identify whether an access request to the second cache 212 results in a cache hit in that cache.

In one embodiment, the computer system 100 of FIG. 4 operates as follows. A demand request issued from the processing unit 202 to the first cache 211 can result in either a cache hit or a cache miss. If it results in a cache hit, then the requested information (e.g., cache line or lines) is fed to the processing unit 202. If it results in a cache miss, then an access request is sent to the second cache 212. If the access request to the second cache 212 results in a cache hit, then the requested information is provided to the processing unit 202 and may also be provided to the first cache 211. If the access request to the second cache 212 results in a cache miss, then the requested information is fetched from the memory 204 and provided to the processing unit 202 and also may be provided to the first cache 211 and/or the second cache 212.

As part of any of the above operations, feedback 440 is provided to the prefetcher 220. Generally speaking, the feedback 440 is used to establish or manage the prefetch distance. More specifically, if the feedback 440 indicates that the access request to the second cache 212 resulted in a cache miss in the second cache, then the prefetch distance can be increased depending on the pattern and confidence level as previously described herein. If, however, the access request resulted in a cache hit in the second cache 212, then the prefetch distance is characterized as being satisfactory, and can advantageously be capped even if the prefetch distance is less than maximum prefetch distance and/or even if the confidence level continues to increase.

In a similar fashion, feedback 450 can be provided to the prefetcher 220 if a demand request issued by the processing unit 202 to the first cache 211 results in a cache hit in the first cache, and that feedback can be used to establish or manage the prefetch distance for the first cache 211. The prefetch distance for the first cache 211 can be managed independent of and can be different from the prefetch distance for the second cache 212.

Furthermore, if the hierarchy of caches includes more than two caches, then the prefetcher 220 can receive feedback for access requests to each of those caches, and can independently establish and control the prefetch distance for each of those caches as just described.

Figure 5A:
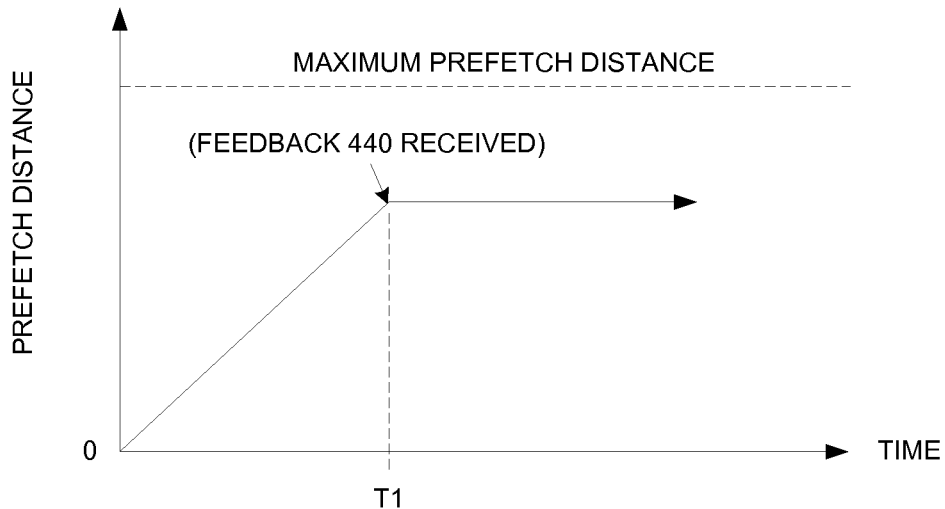
FIGS. 5A and 5B illustrate examples of prefetch distances over time in embodiments according to the present invention.
Figure 5B:
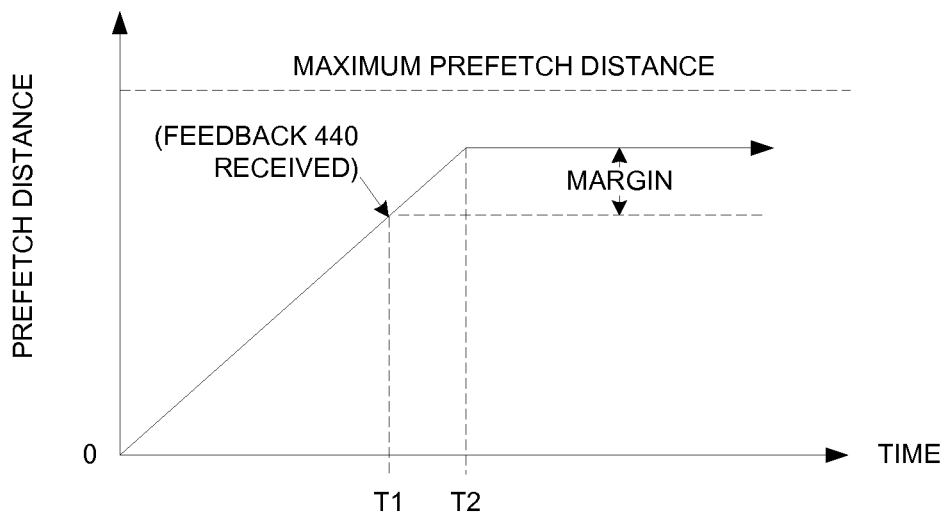

FIGS. 5A and 5B illustrate examples of prefetch distances over time in embodiments according to the present invention. In the example of FIG. 5A, the prefetch distance for the second cache 212, for example, increases over time. At time T1, the feedback 440 indicates that access requests to the second cache 212 are resulting in cache hits. Consequently, the prefetch distance is capped at its current value (the value at time T1), even though the prefetch distance is less than the maximum prefetch distance.

Memory access latency may vary. Consequently, if the prefetch distance is capped and then the memory access latency increases, then access requests from the first cache 211 (based on cache misses in the first cache) that were hitting in the second cache 212 may start to miss in the second cache. In this situation, the prefetcher 220 will detect the pattern of misses in the second cache 212 based on the feedback 440, and as a result can increase the prefetch distance for the second cache as previously described herein.

In the example of FIG. 5B, the prefetch distance for the second cache 212, for example, increases over time. At time T1, the feedback information 440 indicates that access requests to the second cache 212 are resulting in cache hits. However, the prefetch distance is permitted to continue to increase until a specified amount of margin is included in the prefetch distance. For example, if the prefetch distance at time T1 is ten, and the specified amount of margin is four lines, then the prefetch distance is permitted to increase to fourteen (ten plus four). At time T2, when the specified amount of margin is reached, the prefetch distance is capped at its current value (the value at time T2), even though the prefetch distance is less than the maximum prefetch distance. By including margin in the prefetch distance, cache misses that might result from of a change in memory access latency as described above can be reduced in number or eliminated.

As mentioned above, information may be prefetched into both the first cache 211 and the second cache 212. As a consequence, demand misses from the first cache 211 would not be observed because such misses would hit in the first cache if prefetches to the first cache are proceeding successfully. To address this, the feedback information for the second cache 212 can be based on prefetches to the first cache 211. In other words, prefetches for the first cache 211 can be made using the same path observed for prefetches to the second cache 212.

Figure 6:
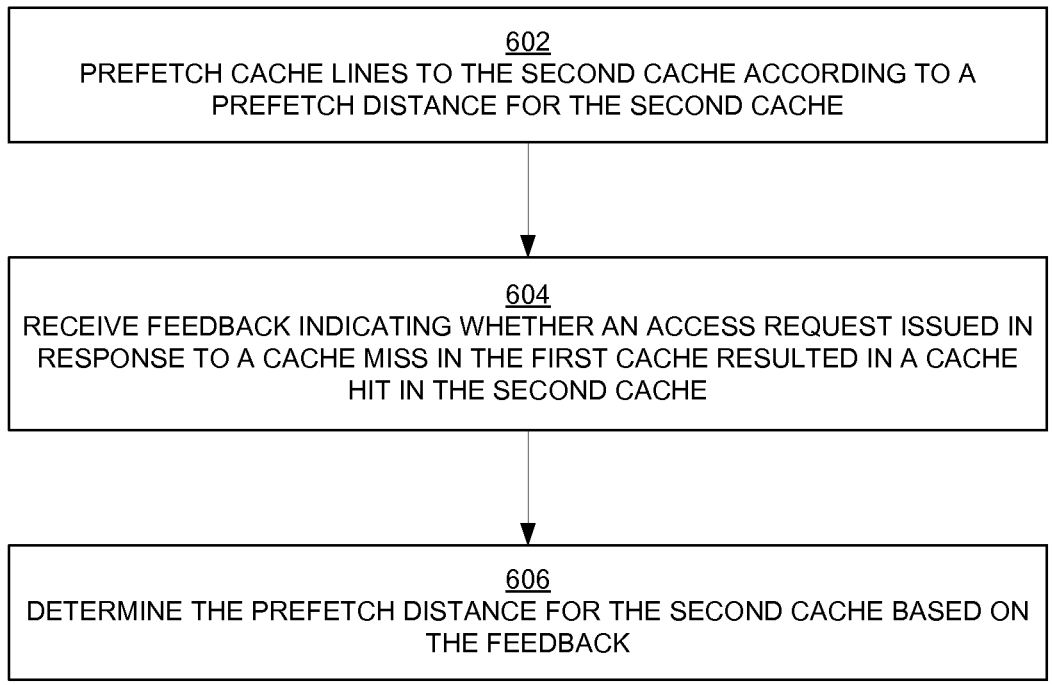
FIG. 6 is a flowchart of an example of a computer-implemented method for managing prefetches in an embodiment according to the present invention.

FIG. 6 is a flowchart 600 of an example of a computer-implemented method for managing prefetches in an embodiment according to the present invention. The flowchart 600 can be implemented as computer-executable instructions residing on some form of computer-readable storage medium (e.g., using computer system 100 of FIG. 1A). FIG. 6 is described in the context of a first cache and a second cache, where the second cache has greater latency then the first cache.

In block 602 of FIG. 6, cache lines are prefetched to the second cache, where the cache lines are selected according to a prefetch distance for the second cache. The prefetch distance increases from an initial value to a first value according to a pattern of cache misses in the second cache.

In block 604, feedback is received from the second cache indicating whether an access request issued in response to a cache miss in the first cache resulted in a cache hit in the second cache.

In block 606, the prefetch distance for the second cache is determined according to the feedback. In one embodiment, if the feedback indicates that the access request resulted in a cache hit in the second cache, then the prefetch distance for the second cache is capped even if the pattern continues to increase in length (even if the confidence level continues to increase) and even if the prefetch distance is less than the maximum prefetch distance. In another embodiment, the prefetch distance for the second cache is permitted to continue to increase to greater than the first value after the cache hit, until the prefetch distance reaches a second value that is larger than the first value by a specified margin.

Thus, in embodiments according to the present invention, the prefetch distance can be capped at a value that it is large enough to reduce cache misses and mitigate the latencies associated with such misses. However, the prefetch distance is also small enough so that it does not result in the eviction of potentially useful cache lines from the caches and does not consume computer resources (e.g., bandwidth) by prefetching relatively large numbers of cache lines when it is not necessary to do so. By managing prefetch distance in embodiments according to the invention, information is still retrieved in advance of when it is needed but not too far in advance; that is, a sufficient number of cache lines are prefetched but not too many cache lines. In effect, prefetches can be postponed without negatively affecting computer system performance.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A system comprising:
    a plurality of caches comprising first cache and a second cache, the second cache having greater latency than the first cache; and
    a prefetcher configured to monitor addresses included in access requests to the second cache, detect a pattern to the access requests, and determine a prefetch distance based on the pattern, the prefetcher further configured to prefetch cache lines to the second cache that are selected according to the prefetch distance and receive feedback from the second cache, the feedback indicating whether an access request issued in response to a cache miss in the first cache results in a cache hit in the second cache, the prefetch distance also determined according to the feedback.

2. The system of claim 1 wherein the prefetch distance increases to a first value according to the pattern, wherein further the prefetch distance is held at the first value in response to the cache hit.

3. The system of claim 1 wherein the prefetch distance increases to a first value according to the pattern, wherein further the prefetch distance continues to increase after the cache hit until the prefetch distance reaches a second value that is larger than the first value by a specified margin.

4. The system of claim 1 wherein the prefetch distance increases to a first value according to a confidence level associated with the pattern, the confidence level comprising a value that increases as the pattern increases in length, and wherein the prefetch distance is held at the first value in response to the cache hit even if the confidence level increases.

5. The system of claim 1 wherein the prefetch distance has a maximum value, wherein the prefetch distance is held at a first value in response to the cache hit, the first value less than the maximum value.

6. The system of claim 1 wherein the prefetcher is further configured to prefetch cache lines to the first cache, wherein the feedback further indicates whether a demand request issued to the first cache results in a cache hit in the first cache.

7. A computer system comprising:
    a processing unit;
    a plurality of caches comprising a first cache and a second cache coupled to the processing unit, the second cache having greater latency than the first cache; and
    memory coupled to the processing unit and having stored therein instructions that, if executed by the computer system, cause the computer system to execute a prefetcher that performs operations comprising:
        monitoring addresses included in access requests to the second Cache;
        detecting a pattern to the access requests;
        determining a prefetch distance based on the pattern and also according to feedback from the second cache, the feedback indicating whether an access request issued in response to a cache miss in the first cache results in a cache hit in the second cache;
        prefetching cache lines to the second cache, wherein the cache lines are selected according to the prefetch distance.

8. The computer system of claim 7 wherein the operations performed by the prefetcher further comprise:
    increasing the prefetch distance to a first value according to a pattern of cache misses in the second cache, wherein the cache misses occur prior to the cache hit in the second cache; and
    maintaining the prefetch distance at the first value in response to the cache hit.

9. The computer system of claim 7 wherein the operations performed by the prefetcher further comprise increasing the prefetch distance to a first value according to a pattern of cache misses in the second cache, wherein the cache misses occur prior to the cache hit in the second cache, wherein further the prefetch distance continues to increase to greater than the first value after the cache hit until the prefetch distance reaches a second value that is larger than the first value by a specified margin.

10. The computer system of claim 9 wherein the first value corresponds to a confidence level associated with the pattern, the confidence level comprising a value that increases as the pattern increases in length, and wherein further the prefetch distance is not increased beyond the first value even if the confidence level increases in response to the cache hit.

11. The computer system of claim 9 wherein the prefetch distance has a maximum value, wherein the first value is less than the maximum value.

12. The computer system of claim 7 wherein the operations performed by the prefetcher further comprise prefetching cache lines to the first cache, wherein the feedback further indicates whether a demand request issued to the first cache results in a cache hit in the first cache.

13. A method implemented by a computer system comprising a processor, a memory, and a plurality of caches coupled to the processor and the memory and comprising a first cache and a second cache, the second cache having greater latency than the first cache, the method comprising:
   monitoring addresses included in access requests to the second cache;
   detecting a pattern to the access requests;
   determining a first value for the prefetch distance based on the pattern and also according to feedback from the second cache, the feedback indicating whether an access request issued in response to a cache miss in the first cache results in a cache hit in the second cache;
   in response to a cache miss in the first cache, sending an access request to the second cache; and
   if the access request results in a cache hit in the second cache, then capping the prefetch distance even if the pattern continues to increase in length.

14. The method of claim 13 wherein the prefetch distance is capped at a second value that is equal to the first value.

15. The method of claim 13 wherein the prefetch distance is capped at a second value that is larger than the first value by a specified margin, wherein the prefetch distance is allowed to increase after the cache hit until the second value is reached.

16. The method of claim 13 wherein the first value corresponds to a confidence level associated with the pattern, the confidence level comprising a value that increases as the pattern increases in length.

17. The method of claim 13 wherein the prefetch distance has a maximum value, wherein the prefetch distance is capped at a value that is less than the maximum value.

18. The method of claim 13 further comprising:
   prefetching cache lines to the first cache; and
   determining whether an access request issued to the first cache results in a cache hit in the first cache.

* * * * *